May 13, 1969  H. C. MORGAN ET AL  3,443,870
RANGE MEASURING SCANNING LASER IMAGING SYSTEM
Filed Sept. 29, 1967
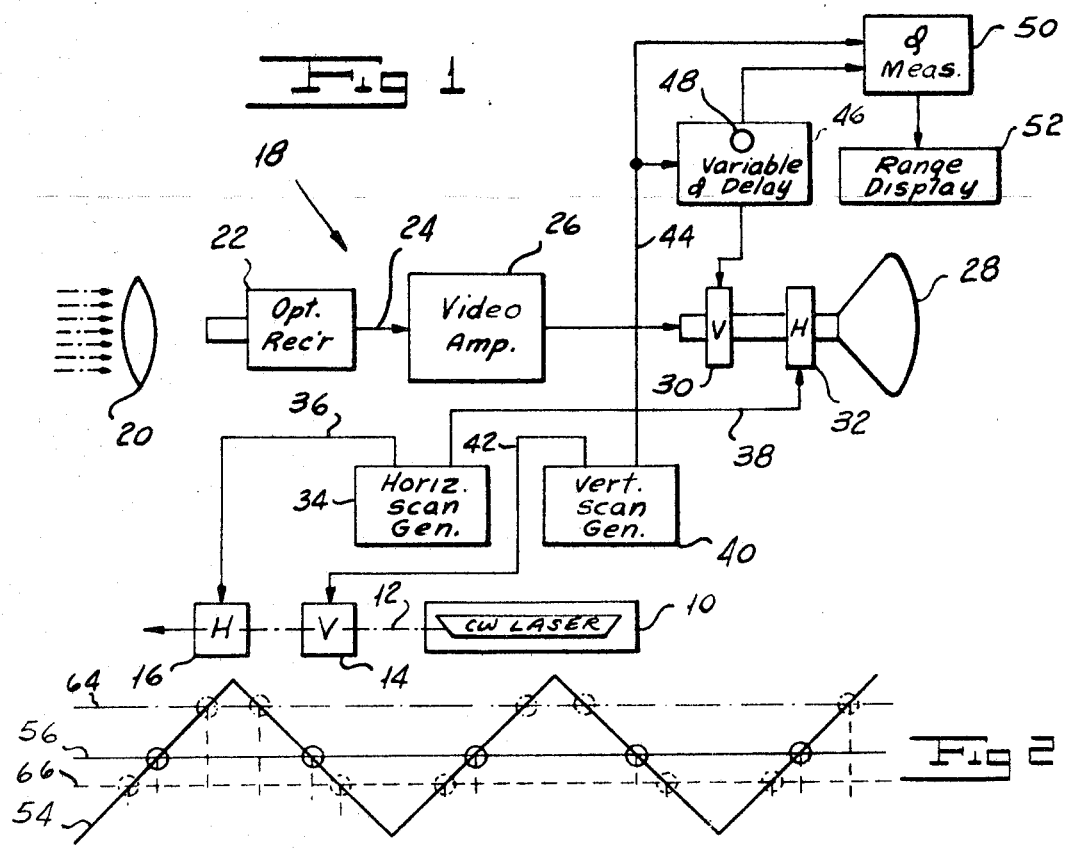
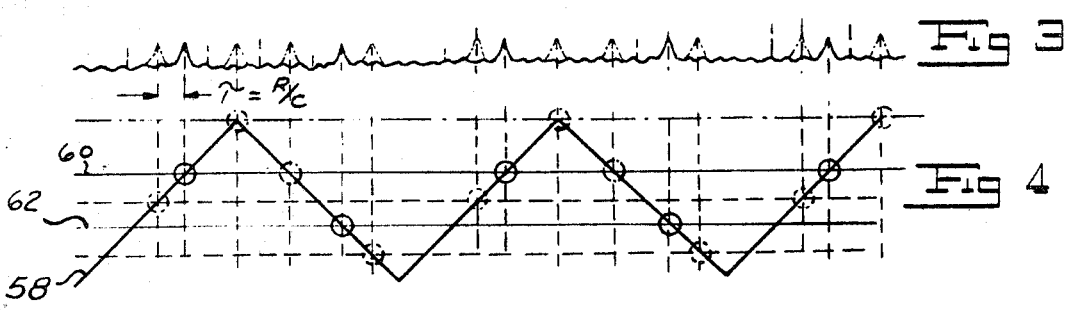
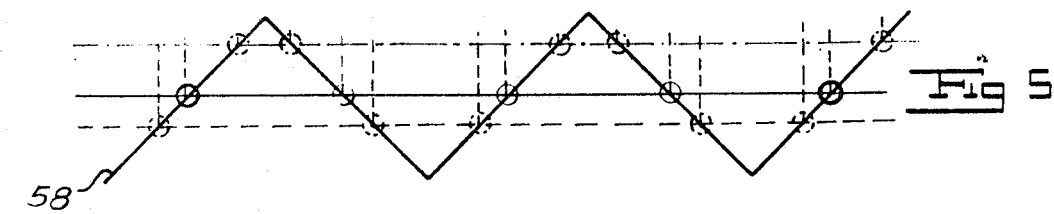
INVENTORS
Huw C. Morgan
Lanny W. Sterritt
BY: Shenier & O'Connor
ATTORNEYS

United States Patent Office 3,443,870
Patented May 13, 1969

3,443,870
RANGE MEASURING SCANNING LASER
IMAGING SYSTEM
Huw C. Morgan, Trumbull, and Lanny W. Sterritt, Norwalk, Conn., assignors to United Aircraft Corporation, East Hartford, Conn., a corporation of Delaware
Filed Sept. 29, 1967, Ser. No. 671,696
Int. Cl. G01c 3/08
U.S. Cl. 356—5   8 Claims

ABSTRACT OF THE DISCLOSURE

A range measuring system employs a scanning laser imaging system. The scanning signal which deflects the laser beam also deflects the electron beam of a cathode ray tube display. A variable phase delay is introduced into the cathode ray tube display scanning signal to eliminate a double image on the face of the display and thereby provide a measure of range to a target which is being scanned by the laser imaging system.

Background of the invention

There are known in the prior art imaging systems in which a laser beam is deflected along two coordinates to scan a target area. The reflected beam is picked up by an optical receiver which produces an output signal which, after being amplified, is fed to the intensity control of a display system. The display device electron beam is deflected correspondingly to the laser beam to provide an image of the target area being scanned by the laser.

It is desirable in a system of the type described above that some means provide an indication of range to a particular target. Attempts have been made in the prior art to obtain an indication of range in such a system. All of these attempts involve some modulation of the laser beam. This modulation is extremely difficult to achieve and even when achieved it deteriorates the image produced on the display.

We have invented a scanning laser imaging system which produces a measure of range to a particular target. Our system provides an indication of range without the necessity of modulating the laser beam. It is simple in construction and operation for the result achieved thereby.

Summary of the invention

One object of our invention is to provide a scanning laser imaging system which gives an indication of range to a particular target.

Another object of our invention is to provide a range measuring scanning laser imaging system which does not require modulation of the laser beam.

A further object of our invention is to provide a range measuring scanning laser imaging system which is simple in construction and in operation for the result achieved thereby.

Other and further objects of our invention will appear from the following description.

In general our invention contemplates the provision of a scanning laser imaging system in which we dispose an actuatable variable phase delay device in the channel which applies the rapid scanning signal to an electron beam deflector in the display device. Actuation of the phase delay device permits a double image of a target which otherwise would be produced to be eliminated so that the amount of phase delay introduced gives a measure of range to the target.

Brief description of the drawings

In the accompanying drawings which form part of the instant specification and which are to be read in conjunction therewith and in which like reference numerals are used to indicate like parts in the various views:

FIGURE 1 is a schematic view of one form of our range measuring scanning laser imaging system.

FIGURE 2 is a diagram illustrating the relationship of the rapid scanning signal of our system to a number of imaginary target lines.

FIGURE 3 is a diagrammatic view illustrating receiver outputs corresponding to the imaginary target lines of FIGURE 2.

FIGURE 4 is a diagrammatic view illustrating the display which results from the signals of FIGURE 3 when no phase delay is introduced into the electron beam rapid scan.

FIGURE 5 is a diagrammatic view of the display which results when a delay corresponding to the range of the imaginary target lines of FIGURE 2 is introduced into the rapid scanning signal of the form of our system illustrated in FIGURE 1.

Description of the preferred embodiment

Referring now to FIGURE 1 of the drawings, our range measuring scanning laser imaging system includes a continuous wave laser 10 which generates an extremely narrow beam 12 of high intensity coherent light. For example, we may employ any continuous wave laser such as a gas laser using helium, neon or argon. Alternatively, we may use a solid crystalline laser such, for example, an yttrium-aluminum-garnet laser.

We pass the beam 12 through respective beam deflectors 14 and 16 to cause the beam to scan a generally rectangular target area. The deflector 14 may be energized with a rapid scanning signal to deflect the beam in a vertical direction.

Such a rapid scanning device might be compressional-mode, liquid, ultrasonic, scanning cell, such as is described in an article "Application of Ultrasonic Standing Waves to the Generation of Optical Beam Scanning" by H. C. Aas and R. K. Erf in the "Journal of the Acoustical Society of America," vol. 36, No. 10, October 1964.

The deflector 16 may be enregized by a relatively slower scanning signal in a manner to be described to cause the beam 12 to be deflectted in the horizontal direction. Any conventional optical scanner such, for example, as a moving-coil galvanometer carrying a mirror may be used for the beam deflector 16. From the structure just described, it will be appreciated that we have provided a beam 12 which is rapidly deflected in a vertical direction by a deflector 14 and relatively slowly deflected in a horizontal direction by the deflector 16 so that the beam scans a generally rectangular target area.

The receiver section, indicated generally by the reference character 18, of our system includes a lens system 20 which focuses reflected light onto an optical receiver 22 which may, for example, be a photomultiplier which puts out a signal on a channel 24 representing the amount of light received. We apply the signal on channel 24 to a video amplifier 26 which, in turn, applies the signal to the intensity control of a display device such, for example, as a cathode ray oscilloscope 28. As is known in the art, the oscilloscope 28 has a vertical beam deflector 30 and a horizontal beam deflector 32.

Our system includes a first sweep signal generator 34 which may, for example, generate the relatively slow horizontal scanning signal which we apply to the optical beam deflector 16 and to the electron beam deflector 32 through respective channels 36 and 38.

A second scanning signal generator 40 provides the relatively rapid vertical deflecting signal which we apply directly to the vertical beam deflector 14 through the channel 42. Another channel 44 carries the vertical scanning signal to a variable phase delay device 46 which applies the signal to the vertical deflecting coil 30 of the display device 28. We provide the variable phase delay device 46 with a knob which can be actuated to change the amount of phase delay introduced into the vertical scanning signal as it is applied to the deflecting coil 30.

We apply the signal on channel 44 and the output signal from the variable phase delay device to a phase difference detector 50. This detector 50 provides an output signal which is a measure of the phase difference between the unshifted vertical scanning signal and the vertical scanning signal after the phase delay has been introduced therein. We apply the output of the phase difference detecting circuit 50 to a display device 52 of any suitable type known to the art to afford an indication of range in a manner to be described.

In most conventional deflecting systems an asymmetrical signal is used for the rapid scan, which signal has a relatively slow rise and a substantially instantaneous flyback. In our system, however, as is illustrated in FIGURE 2, we employ a symmetrical signal indicated by the solid triangular line 54 as the rapid vertical scan signal. While for purposes of simplicity in explanation we have shown a triangular waveform, in practice we may use a sinusoidal wave and provide compensating circuitry to account for the nonlinear character of the sinusoidal signal near the ends of the scan.

In FIGURE 2 we have shown an imaginary target line, indicated by the straight solid line 56, at an assumed range. From the representation of the scanning signal 54 it will be apparent that the beam 12 crosses the line 56 during each upward excursion and during each downward excursion therof. We have circled the points of intersection with solid line circles in FIGURE 2. It will readily be appreciated that the time for reflected light to travel from the target back to the receiver 18 is $T=R/C$ where R is the range and C is the speed of light. Thus, as is shown in FIGURE 3, the optical receiver 22 puts out a pulse which is delayed with respect to the circled points of FIGURE 2 by a time T.

The pulses of FIGURE 3 which are amplified and fed to the intensity control of the display device 28 will appear as bright spots on the tube screen at times at which they coincide with the vertical scanning signal applied to the deflecting coil 30. Assuming that there has been no phase delay introduced into the scanning signal applied to the coil 30, the pulses indicated in full lines in FIGURE 3 arrive at times on the vertical electron beam sweep such as are indicated by the full line circles in FIGURE 4. It will readily be seen that the first pulse corresponds to a time on the electron beam sweep 58 which is after the corresponding time on the optical sweep 54. Similarly, the second delay pulse corresponds to a point on the electron beam sweep 58 which is after that point on the sweep 54 which produced the pulse. Each group of the delayed pulses, corresponding respectively to upward excursions and downward excursions of sweep 54, produces it own image so that when no phase delay has been introduced into the electron beam sweep 58, there appear on the screen of tube 28 two images 60 and 62 of the line 56. One of the images is above the position at which the line would be thought to appear and one below that position. It will further readily be appreciated that the displacement of each of these images from the point at which it would be thought that the image would appear is proportional to the range to the line 56.

In order to eliminate the double image and thus to afford a measure of range, we operate the control knob 48 to shift the electron beam rapid scan 58 by an amount equal to the delay between the point at which the optical beam 54 crosses the target line and the time of occurrence of the corresponding pulse produced by the receiver 22.

We have illustrated this condition in FIGURE 5 wherein the scan 58 has been shifted through $T=R/C$. It will be seen from the figures that, under this condition, both the first and second delayed pulses are at corresponding points with reference to the waveform 58 and only a single image is produced. Moreover, the amount of delay introduced into the vertical scan is a measure of range. We apply this signal together with the reference rapid scan signal to the phase difference detector 50 to supply a signal to the display device 52 to indicate range.

It will be apparent to those skilled in the art that we are able to obtain a measure of range in the manner described owing to the symmetry of the scanning waveform 54 which is employed in our scanning laser imaging system. Moreover, we can obtain the same result no matter in what position in the scanned field the reference line exists. By way of illustrating this fact, we have shown a dot-dash line 64 and a broken line 66 in the scanned field at the same range as the line 56 but one above and one below the location of line 56. The analysis of the production of double images and the elimination thereof can be followed through in the same manner as that described above in connection with the line 56.

In operation of our range measuring scanning laser imaging system, assuming that knob 48 is in a position at which no delay is introduced into the electron beam scanning signal applied to coil 30, the laser beam 12 is directed to the target area to be scanned. Reflected radiation passes through the lens 20 to the receiver 22 which produces a signal which is amplified by amplifier 26 and then applied to the intensity control of the display device 28. When the observer sees a double image of a particular target line 56, for example, on the screen and he wishes to obtain a measure of the range to that point, he operates the control 48 until the double image has been eliminated. When that occurs, the phase difference determining circuit 50 puts out a signal which is a measure of phase difference and consequently of range. This signal is applied to the display device 52 to afford a measure of range.

It will be seen that we have accomplished the objects of our invention. We have provided a scanning laser imaging system which affords a measure of range. Our system does not require that the laser beam be modulated in order to obtain the range measure. It is extremely simple in its construction and in its operation for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A scanning laser imaging system including in combination, a source of a laser beam, means for deflecting said laser beam, a display device having electron beam deflecting means, a source of a scanning signal, means for applying said scanning signal to said laser beam deflecting means and means including phase shifting means for applying said scanning signal to said electron beam deflecting means.

2. A scanning laser imaging system as in claim 1 in which said scanning signal is symmetrical.

3. A scanning laser imaging system as in claim 1 in which said phase shifting means is variable.

4. A scanning laser imaging system as in claim 1 including means for measuring the phase shift introduced by said phase shifting means and means responsive to said measuring means for providing an indication of range.

5. A scanning laser imaging system in claim 1 including a receiver responsive to reflected light from said beam for producing an electrical signal and means for applying said signal to said display device.

6. A scanning laser imaging system as in claim 1 in which said laser beam deflecting means and said electron beam deflecting means correspond to a first coordinate of a coordinate system, second laser beam deflecting means, said display system including second electron beam deflecting means, said second laser beam and electron beam deflecting means corresponding to another coordinate of said coordinate system, a source of a second scanning signal and means for applying said second scanning signal to said second laser beam deflecting means and to said second electron beam deflecting means.

7. A scanning laser imaging system for providing a measure of range to a target within an area including in combination, a source of a laser beam, first means for deflecting said laser beam with reference to a first coordinate, second means for deflecting said laser beam with reference to a second coordinate, said deflecting means adapted to cause said laser beam to scan said area, an electron beam device comprising first means for deflecting said electron beam with reference to said first coordinate and second means for deflecting said electron beam with reference to said second coordinate, a source of a first scanning signal, means for applying said first scanning signal to each of said first deflecting means, a source of a second symmetrical scanning signal, means for applying said second scanning signal to said second laser beam deflecting means, and means including variable phase shifting means for applying said second scanning signal to said second electron beam deflecting means, the arrangement being such that in the absence of phase shift said target produces a double image on said display device, said phase shifting means being adapted to be actuated to remove said double image.

8. A scanning laser imaging system as in claim 7 including means responsive to said phase shifting means for producing an indication of range to said target.

References Cited

UNITED STATES PATENTS 3,300,777   1/1967   Tarr ------------------ 343—6

RODNEY D. BENNETT, Jr., *Primary Examiner.*

CHARLES E. WANDS, *Assistant Examiner.*